Oct. 4, 1966  J. MARCHAND  3,276,606
TRANSFER MECHANISM
Filed Feb. 23, 1965  4 Sheets-Sheet 1
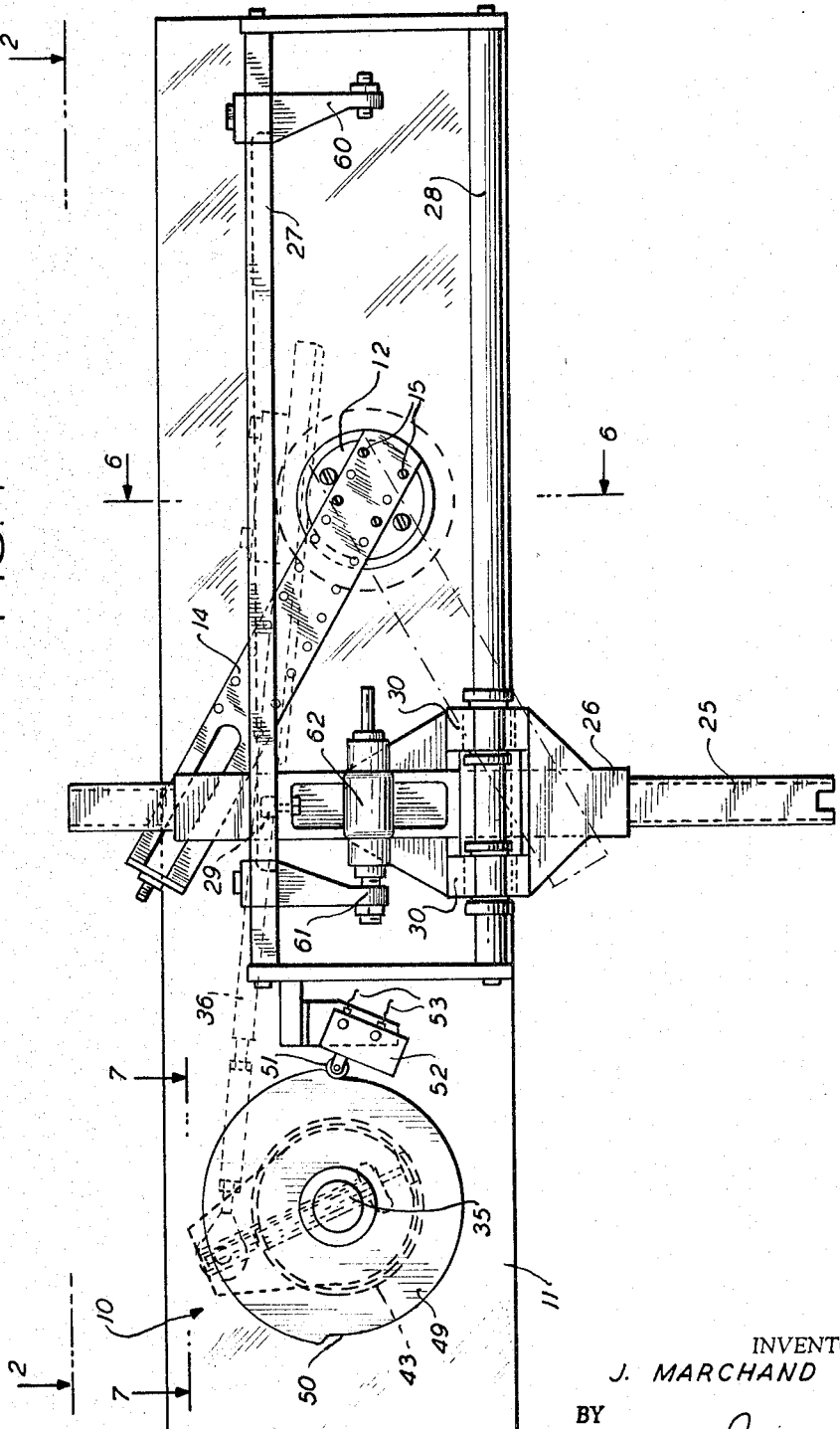
INVENTOR.
J. MARCHAND
BY
ATTORNEY

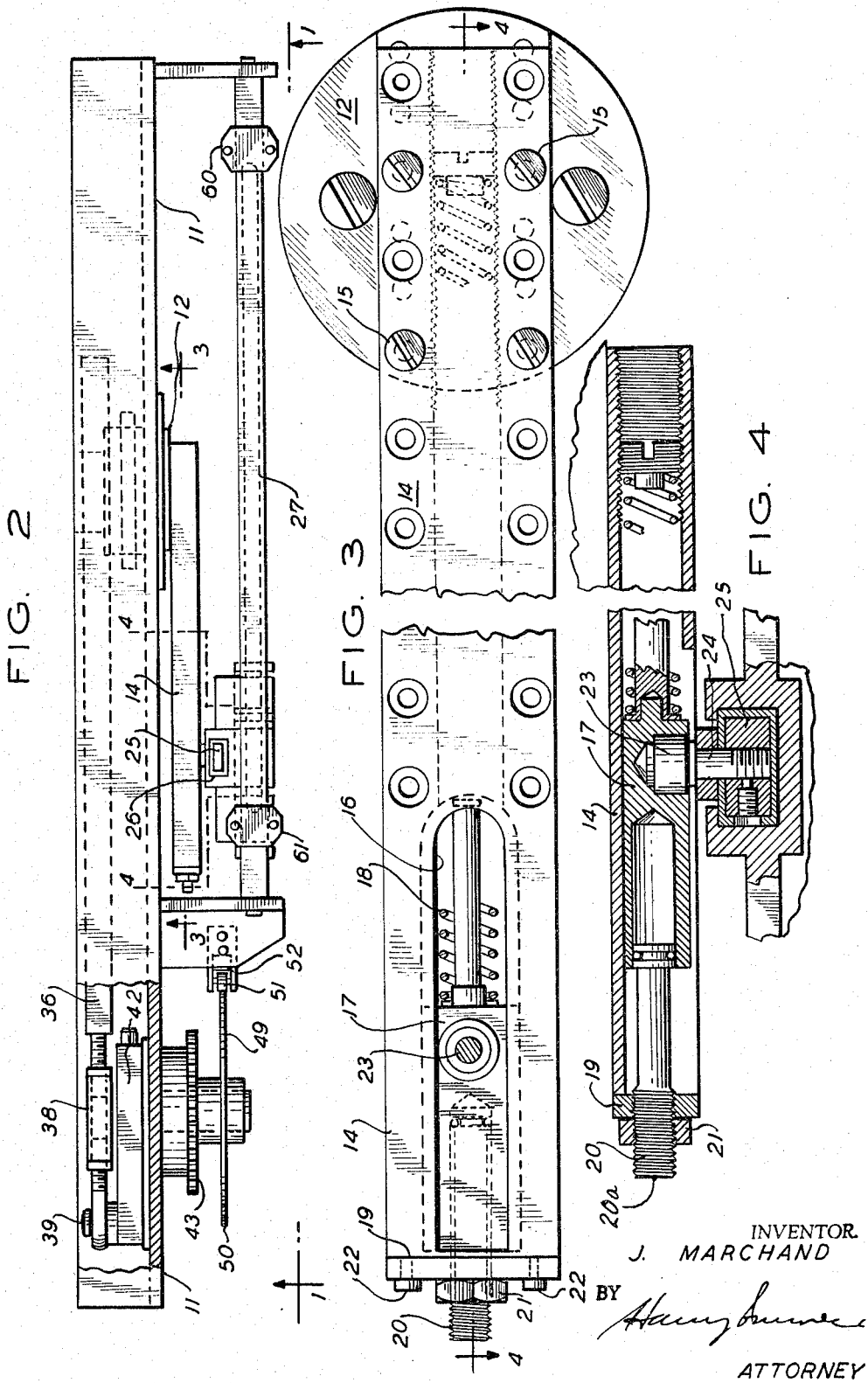

Oct. 4, 1966 J. MARCHAND 3,276,606
TRANSFER MECHANISM
Filed Feb. 23, 1965 4 Sheets-Sheet 3
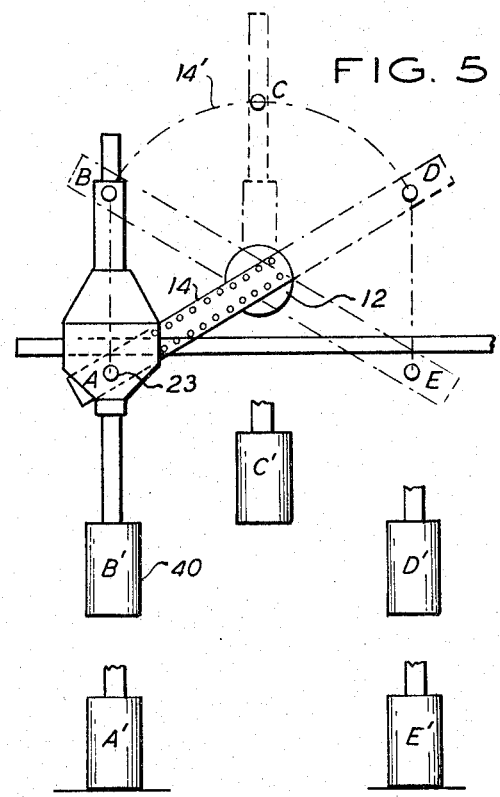
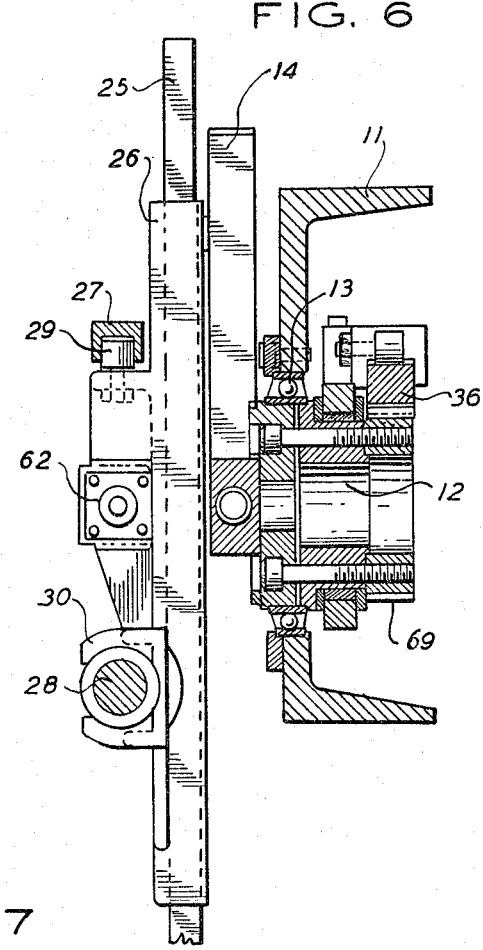
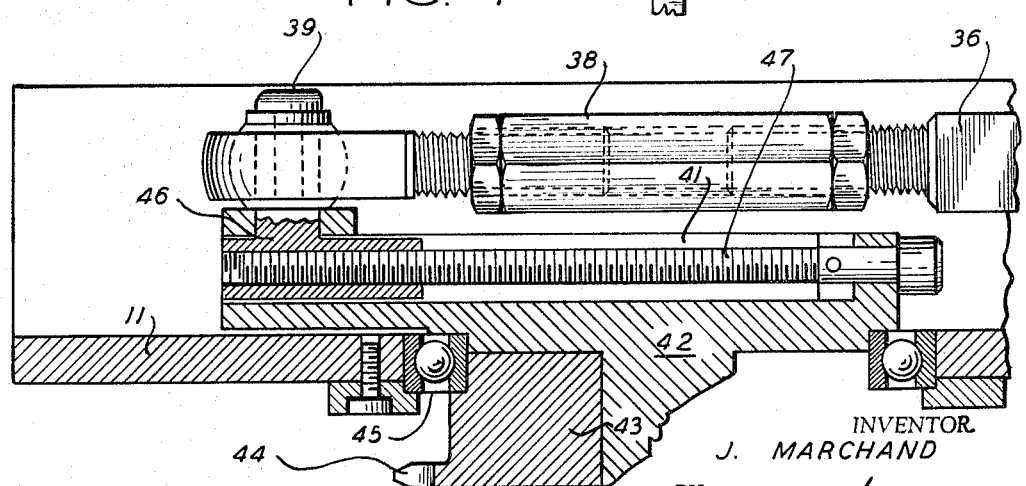
INVENTOR.
J. MARCHAND
BY
ATTORNEY

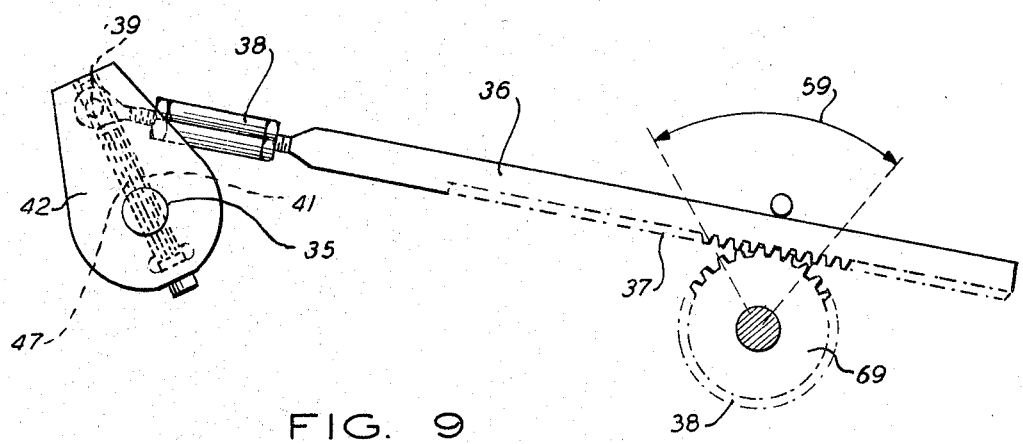
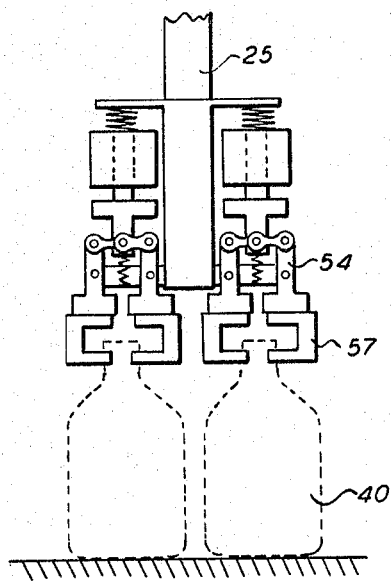
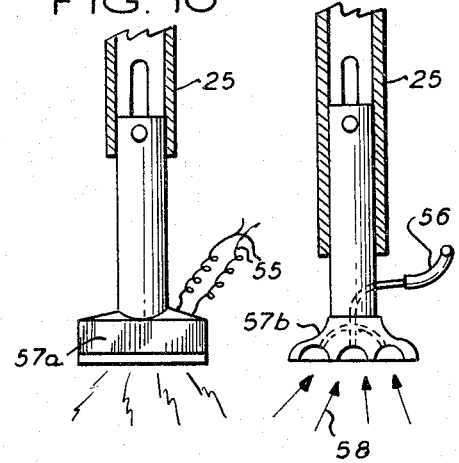

United States Patent Office 3,276,606
Patented Oct. 4, 1966

3,276,606
TRANSFER MECHANISM
Jacques Marchand, 381 Broad St., Newark, N.J.
Filed Feb. 23, 1965, Ser. No. 434,487
21 Claims. (Cl. 214—1)

This invention relates to an article transfer mechanism designed to provide a relatively simple, automatic article transfer means pursuant to which articles may be moved from a given station to another station, in an accurate fashion, the articles being engaged automatically to initiate the transfer cycle, and disengaged at the completion thereof.

The invention incorporates novel features of adjustability such as to adapt it to an infinite range of uses wherein, for example, articles are to be positioned at stations located at different vertical and horizontal planes and at stations variously spaced.

Pursuant to the invention, the articles are moved vertically from a loading position, horizontally and then vertically to the unloading posiiton. The articles may be picked up automatically pursuant to the invention at the loading position and automatically deposited at the completion of the transfer cycle in a harmonic, smooth, continuous operation. The apparatus is adaptable to various requirements such as high-low, high-high, low-low and low-high, for vertical rise and descent or curved rise and descent as required. It is adapted to be readily and universally applied to existing equipment or integrated therewith or for new automatic machinery, and may be cycled with any desired power source and programmed from camming drives or interlocking systems. It is adapted to be used in connection with any desired or convenient delivery mechanisms, which may be automatically actuated to synchronize with the transfer cycles.

The invention maintains stability to the articles being transferred throughout the transfer cycle and does not impose sudden or severe shifts in movement, such as might affect the contents of containers, for example, which may be transferred pursuant to the invention.

The drawings, illustrating procedures and devices useful in carrying out the invention, which shall be deemed to cover all other devices and procedures coming within the scope and purview of the appended claims.

In the drawings, wherein similar reference characters indicate like parts:

FIG. 1 is a side elevational view of a transfer mechanism embodying the invention, taken at line 1—1 of FIG. 2, FIG. 2 is a top plan view thereof, taken at line 2—2 of FIG. 1, FIG. 3 is an enlarged, fragmentary elevational view, taken at line 3—3 of FIG. 2, FIG. 4 is an enlarged, fragmentary, sectional view, taken at line 4—4 of FIGS. 3 and 2, FIG. 5 is a schematic, front elevational view, to exemplify the station-station transfer of articles with the transfer mechanism of this invention, FIG. 6 is an enlarged, fragmentary, vertical sectional view, taken at line 6—6 of FIG. 1, FIG. 7 is an enlarged, fragmentary partly horizontal sectional view, taken at line 7—7 of FIG. 1, FIG. 8 is a schematic elevational view, illustrating the drive mechanism for the bearing of the invention, and FIGS. 9, 10 and 11 are schematic elevational views of article engaging means adapted for use in connection with the transfer slide member of the invention, for selectively engaging articles for station-station movement and to release them from the transfer mechanism upon completion of the transfer operation.

As shown in the drawings (FIG. 1), the device of this invention comprises an article transfer mechanism 10 which may be mounted on a suitable frame 11 forming a fixed or portable part of a machine or other support A bearing member 12 (FIGS. 1, 5, 6, 3) is rotatably journalled, as for example, in antifriction rollers 13 (FIG. 6) in frame 11, and arm member 14 is secured to the bearing 12 at one end as (FIG. 3) by bolts 15. The arm is provided with a slot 16 in which block 17 (FIG. 3) is slidably disposed. A spring 18 bearing against the block and arm at opposite ends, urges the block away from the bearing 12. Spring pusher block 17 is urged by spring 18 (FIG. 3) against the head 20a of the bolt 20 which may be threadedly adjusted by rotation in threaded plate 19 fixed, as by bolts 22, to arm member 14, by threading bolt 20 inwardly or outwardly. The most outward position of bolt 20 would be that in which the head 20a thereof seats on plate 19 (absorbs impact) vertical to horizontal direction, which then keeps block 17 from fully seating on plate 19. Adjustment of the position of bolt 20 to thus adjust the movement of the block 17 provides a shorter or longer radius (14', FIG. 5) for increment adjustments for lesser distances than those between bolts 15. Roller 23 engages the block and is fixed by pin 24 to article transfer member 25, vertically movable in the vertical alignment member 26 (FIG. 1).

By the arrangement described, it will be apparent that, on rotation of the bearing member 12, the transfer member 25 will be vertically moved in the alignment member 26. The latter (FIGS. 1 and 6) may have sliding engagement with parallel horizontal rails 27, 28 as by providing a roller 29 on the alignment member 26 engaging the rail 27 and a bracket 30 on member 26 engaging the rail 28 (or other means to the same end). Thus, on rotation of the bearing 12, the transfer member 25 will be moved vertically and horizonally. The bearing 12 is driven from a suitable power source, as for example, drive shaft 35 (FIG. 1) connected to the bearing 12 by link 36. The latter (FIG. 8) may comprise a rack having teeth 37 meshing with teeth 68 of the pinion 69 keyed (FIG. 6) to bearing 12 by bolts or other suitable means. The connection between the link 36 and the driving member 35 may (FIG. 8) comprise axially adjustable means 38 for connecting the link to a point 39 radially of the axis of the rotating driving member 35 such that an eccentric crank drive is achieved, for the purpose, for example (FIG. 5), of moving the article 40 from an initial (B') position, which may be a loading point or points (to which the articles 40 are suitably initially delivered serially or progressively, as by turret, automatic line feeder or other means) to advance the article to the C' and then D' position (or A' to E') in movement of the roller 23 of arm 14 in rotation of the bearing 12 from (FIG. 5 position A, to position B, to position C and then to position D and position E, the arm 14 moving in the arcuate path 14'.

Member 38 is a coupling sleeve which may be exteriorly contoured for facility of engagement by tools to turn the same, and internally threaded with left and right threads to be engaged by similarly externally threaded portions of studs extending respectively from link 36 (FIGS. 2 and 7) and (stud pivotally mounted on) pin 39. By turning sleeve 38 clockwise or counterclockwise members 36 and 39 are moved together or apart, correspondingly altering the arc clockwise or counterclockwise position of (59, FIG. 8) travel of arm 14, relative to the center of bearing 12. Rotation (clockwise or counterclockwise) of threaded pin 47 (FIG. 7) correspondingly lengthens or shortens said arc (59) of movement.

The crank plate 42 rotates 180 degrees during the described cycle of movement of the articles from the load to unloading stations.

The point of connection of the link 36 to the rotating driving member 35 may be defined by a pin 39 (FIGS. 7 and 8) movable in slot 41 of plate 42 fixed to a gear 43, which may have external gear teeth 44 for driving the shaft 35 from a suitable power source. The gear 43 may (FIG. 7) be rotatably journalled in the frame 11. Pin 39 may be fixed to sleeve 46 mounted on pin 47 threadedly fixed to the plate 42 for adjustment of the position of pin 39. A cam 49 is (FIG. 1) also keyed to driving member 35 and rotates in unison therewith, the cam surface 50 through a follower 51 actuating a switch 52, controlling, through wires or other means 53, electrical opening and closing mechanisms 54 (FIG. 9), electromagnetic means 57A with leads 55 connected to wires 53 of switch 52 (FIG. 10), or vacuum means 57b (FIG. 11) which may in turn have electrically actuated vacuum line 56. The arrangement in each instance is such that, through the cam 50 control of switch 51, the article engaging members, such as the mechanical latch members 57 of FIG. 9, will be actuated to close on the articles 40 at the initiation of the transfer cycle and to release said articles at the completion thereof; in the case of the electromagnetic head 58 of FIG. 10 the articles secured to the article transfer member 25 may be held magnetically during the transfer cycle; in the case of the vacuum head 57a in (FIG. 11) the articles are held by vacuum as noted by the arrows 58. In each instance, the switch 52 achieves holding of the article from the loading station to the discharge station as desired.

The adjustable means 38 (FIGS. 2 and 7) enables adjustment to be made of the arc 59 (FIG. 8) of reciprocation of link 36 in each cycle of rotation of the driving member 35.

It will be apparent from the foregoing that the transfer mechanism operates through 180° of rotation of the rotating member 35; for the following 180° reverse movement is attained, restoring the transfer mechanism to its original (loading) position.

Suitable stop members 60, 61 (FIG. 1) may be provided; an air cylinder 62 or other shock absorbing mechanism may be fixed to the vertical alignment member 26 and movable therewith to engage the stop members 60, 61. Stops 60, 61 thus restrain alignment member 26, thus in turn restraining transfer member 25 and pin 24 thereof so that the arc 14' of transfer may be shortened horizontally (within limits) as desired; in any case, at the ends of the arc, vertical movement of transfer member 25 and articles carried thereby is thus achieved at essentially a very slow rate. On the upstroke, at the initiation of the transfer cycle, vertical movement of the transfer member 25 and articles carried thereby provides inertia to carry the same horizontally and then the (vertical downward) terminal portion of movement at a slow rate. Thus no stress or strain is imposed on the articles being transferred, power is conserved and strain on the operating mechanism is kept to a minimum.

The vertical transfer member 25 and the alignment member 26 having complementary interengagement to achieve the purposes above noted, may be formed of complementary channeled cross sectional configuration (FIG. 4).

While the foregoing disclosure of exemplary embodiments is made in accordance with the patent statutes, it is to be understood that the invention is not limited thereto or thereby, the inventive scope being defined in the appended claims.

I claim:

1. An article transfer mechanism comprising a frame, an arm pivotally mounted at one end to said frame, a vertical guide means mounted for horizontal movement along the frame, a transfer member slidably engaging said guide means for vertical slidable movement with respect thereto, to thereby correspondingly move articles secured to the transfer member, means connecting the other end of the arm to the transfer member, and means for rotating the arm to thereby move the transfer member and article secured thereto for transfer purposes.

2. In an article transfer mechanism as set forth in claim 1, said means connecting the arm to the transfer member, comprising complementary slot and pin means for effecting vertical movement of the transfer member on radial movement of the arm.

3. In an article transfer mechanism as set forth in claim 1, said means connecting the arm to the transfer member, comprising a roller secured to and extending from the transfer member and a block slidably movably connected to the arm.

4. In an article transfer mechanism as set forth in claim 1, said means connecting the arm to the transfer member, comprising a member secured to and extending from the transfer member, and engaging a slot formed in said arm.

5. In an article transfer mechanism as set forth in claim 1, wherein said vertical guide means is secured to the frame for horizontal movement, and including rails mounted in spaced parallel horizontal relation on the frame, and means on said vertical guide means engaging said rails to secure said guide means to the frame for horizontal movement along the frame.

6. In an article transfer mechanism as set forth in claim 1, said means connecting the arm to the transfer member, comprising a block movably positioned in the arm, and means engaging the block and arm for adjusting the outermost position of the block in the arm with respect to said one end of the arm, and a member secured to the transfer member and engaging the block.

7. In an article transfer mechanism as set forth in claim 6, spring means engaging the block and arm for biasing said block away from said one end.

8. In an article transfer mechanism as set forth in claim 1, said means for rotating the arm comprising a rotating drive member and a link connecting the rotating drive member to the arm.

9. In an article transfer mechanism as set forth in claim 8, said link and bearing member having complementary drive means.

10. In an article transfer mechanism as set forth in claim 8, said link having an elongated rack, and a pinion in driving relation with said arm and engaged by said rack.

11. In an article transfer mechanism as set forth in claim 8, said link being adjustably secured to the rotating driving member.

12. In an article transfer mechanism as set forth in claim 8, a slotted plate keyed to said drive member and a roller secured to the link and slidably disposed in said slot to so connect the link to the driving member.

13. In an article transfer mechanism as set forth in claim 12, means adjustably so securing the roller to the link.

14. In an article transfer mechanism as set forth in claim 8, a cam keyed to the driving member, a follower engaging said cam, automatic article engaging means secured to the transfer member, and switch means actuated by the position of the follower on the cam, to actuate the article engaging means, for engaging and carrying the articles during the transfer cycle and for disengaging the articles from the transfer mechanism at the completion of said cycle.

15. The article transfer mechanism of claim 6 wherein said means engaging the block and arm includes a cylinder and piston integral with said block, said cylinder and piston being additionally operative to bias said block against movement outwardly with respect to said one end of the arm, and means on said arm for biasing said block toward its outermost position.

16. The article transfer mechanism of claim 15 wherein said means biasing said block includes a spring member extending substantially the length of said arm between said one end and said block.

17. The article transfer mechanism of claim 1 including horizontal stops positioned on said frame for limiting horizontal movement of said vertical guide means.

18. The article transfer mechanism of claim 1 wherein the length of said arm between said one end and said means connecting the arm to the transfer member can be varied to vary the travel of said transfer member.

19. The article transfer mechanism of claim 1 wherein said means for rotating the arm is operative to oscillate the arm arcuately through an arc greater than 90° and less than 270°.

20. The article transfer mechanism of claim 19 including arc positioning means operative to vary the start and end positions of the arc of travel of the arm produced by said means for rotating the arm.

21. The article transfer mechanism of claim 19 including arc length varying means, said arc length varying means being operative to vary the arc of travel of the arm as operated by said means for rotating the arm.

References Cited by the Examiner

UNITED STATES PATENTS

| | | |
|---|---|---|
| 1,766,574 | 6/1930 | Westin et al. |
| 2,737,389 | 3/1956 | Evans et al. _____ 271—26 X |
| 2,924,718 | 2/1960 | Packard et al. _____ 214—1 X |

MARVIN A. CHAMPION, *Primary Examiner.*